(12) United States Patent
Schütz

(10) Patent No.: US 11,325,644 B2
(45) Date of Patent: May 10, 2022

(54) STEERING WHEEL ASSEMBLY

(71) Applicant: ZF AUTOMOTIVE SAFETY GERMANY GMBH, Aschaffenburg (DE)

(72) Inventor: Dominik Schütz, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 16/980,495

(22) PCT Filed: Mar. 7, 2019

(86) PCT No.: PCT/EP2019/055664
§ 371 (c)(1),
(2) Date: Sep. 14, 2020

(87) PCT Pub. No.: WO2019/179777
PCT Pub. Date: Sep. 26, 2019

(65) Prior Publication Data
US 2021/0024128 A1    Jan. 28, 2021

(30) Foreign Application Priority Data
Mar. 23, 2018 (DE) ..................... 20 2018 101 635.0

(51) Int. Cl.
*B62D 7/22* (2006.01)
*B60R 21/203* (2006.01)
*B62D 1/11* (2006.01)

(52) U.S. Cl.
CPC .......... *B62D 7/222* (2013.01); *B60R 21/2037* (2013.01); *B62D 1/11* (2013.01)

(58) Field of Classification Search
CPC .. B62D 7/22; B62D 7/222; B62D 1/11; B60R 21/2037; B60R 21/23571; B60Q 5/003
See application file for complete search history.

(56) References Cited

U.S. PATENT DOCUMENTS 4,785,144 A * 11/1988 Fosnaugh .............. B60Q 5/003
200/61.55
5,283,404 A    2/1994 Prescaro, Jr.
(Continued)

FOREIGN PATENT DOCUMENTS

DE          3710173    10/1988
DE      102004051942     5/2006
(Continued)

OTHER PUBLICATIONS

Description Translation for DE 3,710,173 from Espacenet (Year: 1988).*
(Continued)

*Primary Examiner* — James A English
*Assistant Examiner* — Daniel M. Keck
(74) *Attorney, Agent, or Firm* — Tarolli, Sundheim, Covell & Tummino LLP

(57) ABSTRACT

The invention relates to a steering wheel assembly (10) comprising a steering wheel skeleton (12), an attachment component (14), a connection component (20) for fastening the attachment component (14) to the steering wheel skeleton (12), and a first resilient damping element (16) which couples the connection component (20) to the attachment component (14) so as to be able to oscillate, a second resilient damping element (18) being provided which couples the connection component (20) to the steering wheel assembly (12) so as to be able to oscillate.

20 Claims, 1 Drawing Sheet

(56) References Cited

U.S. PATENT DOCUMENTS

| | | | | |
|---|---|---|---|---|
| 5,650,600 | A * | 7/1997 | Walters | B60Q 5/003 |
| | | | | 200/61.54 |
| 6,398,255 | B1 * | 6/2002 | Scherzinger | B60Q 5/003 |
| | | | | 280/728.1 |
| 6,464,247 | B1 * | 10/2002 | Laue | B62D 7/222 |
| | | | | 280/728.2 |
| 11,021,125 | B2 * | 6/2021 | Card | B60R 21/203 |
| 2006/0197323 | A1 | 9/2006 | Pillsbury, IV et al. | |
| 2019/0217800 | A1 | 7/2019 | Mcmillan et al. | |

FOREIGN PATENT DOCUMENTS

| | | | |
|---|---|---|---|
| DE | 202007019605 | 7/2014 | |
| DE | 202017104817 U1 * | 9/2017 | B60R 21/235 |
| JP | 2014094703 | 5/2014 | |
| WO | 2014080713 | 5/2014 | |

OTHER PUBLICATIONS

Description Translation for DE 202017104817 from Espacenet (Year: 2017).*

* cited by examiner

STEERING WHEEL ASSEMBLY

RELATED APPLICATIONS

This application corresponds to PCT/EP2019/055664, filed Mar. 7, 2019, which claims the benefit of German Application No. 20 2018 101 635.0, filed Mar. 23, 2018, the subject matter of which are incorporated herein by reference in their entirety.

BACKGROUND OF THE INVENTION

The invention relates to a steering wheel assembly comprising a steering wheel skeleton, an attachment component, a connection element for fastening the attachment component to the steering wheel skeleton and a first resilient damping element which couples the connection element to the attachment component so as to be able to oscillate.

In numerous vehicle steering wheels, vibrations which the driver feels to be disturbing occur during idling or in particular speed ranges of the vehicle. Said vibrations are due, inter alia, to the rigid coupling of the steering wheel to the steering column.

It is known to make use of so-called vibration absorbers for avoiding the undesired steering wheel vibrations so as to adapt the inherent frequency of the total system such that it is within an uncritical range. Currently, for example the gas generator of an airbag module disposed in the steering wheel is used as a counter-oscillating absorber mass.

Since the vibration absorption improves with an increasing absorber mass, in DE 37 10 173 C3 already a motor vehicle steering system is described in which the entire airbag module is advantageously utilized as absorber mass. The shearing rigidity of the vibration dampers used helps to adjust the first inherent frequency of the steering wheel/module system to be so low that it will be within a speed range of the vehicle in which there will not yet occur any high exciting amplitudes (e.g. at about 120 km/h).

DE 20 2017 104 817 U1 discloses a generic steering wheel assembly in which a screw bolt is tightly screwed with the steering wheel skeleton and an attachment component is supported on the screw bolt so as to be oscillatory, the attachment component serving especially as support for an airbag module. The illustrated vibration absorber structure is especially compact and includes a resonance field which can be used for reducing the steering wheel vibrations and which, to a limited extent, can be adapted to the requirements and boundary conditions of the respective vehicle. However, the constructional design of the steering wheel assembly according to DE 20 2017 104 817 U1 reaches its limits when resonance fields in an especially deep frequency spectrum are required, for example for frequencies of less than 30 Hz.

SUMMARY OF THE INVENTION

Therefore, it is the object of the invention to provide an especially compact steering wheel assembly, wherein a steering wheel skeleton and an attachment component for an airbag module are coupled to be able to oscillate such that in the later vehicle operation a resonance field adapted to cover even especially low frequencies is formed.

In accordance with the invention, this object is achieved by a steering wheel assembly of the type stated in the beginning in which a second resilient damping element is provided which couples the connection element to the steering wheel skeleton so as to be able to oscillate. Since, in this case, both between the attachment component and the connection element and between the steering wheel skeleton and the connection element a vibration-damping support is provided, an oscillating system comprising coupled oscillators, viz. a damped double-mass oscillating system, is advantageously formed whose resonance field can be adapted via an especially large frequency spectrum and, in the later driving operation, may comprise even frequencies of less than 30 Hz, for example. Depending on the detailed design of the steering wheel assembly, the changed oscillating system has hardly any or no effect at all on the space required of the vibration absorber structure.

In accordance with one embodiment of the steering wheel assembly, the attachment component is a mounting plate for an airbag module. After fastening the mounting plate to the steering wheel skeleton, the airbag module is connected, especially snap-fastened, to the mounting plate. A relative movement for actuating a vehicle horn then may optionally take place between the airbag module and the mounting plate or inside the airbag module. It is alternatively also imaginable that the attachment component itself already is a component of the airbag module. In this case, a relative movement for actuating a vehicle horn then may optionally take place between the attachment component and the steering wheel skeleton or inside the airbag module.

The steering wheel skeleton preferably is a one-piece metal part that forms for example a steering wheel hub, at least a spoke and a steering wheel rim, but optionally it may also comprise attachment components which are substantially rigidly connected, especially tightly screwed or welded, to the metal part.

Preferably, the first damping element is fixed substantially free from play on the attachment component and is especially positively connected to the attachment component. Analogously, the second damping element is preferably fixed substantially free from play, especially positively connected, to the steering wheel skeleton. In this way, in an idle state of the steering wheel assembly the attachment component can be positioned very accurately relative to the steering wheel skeleton. Later, when a vehicle steering wheel is completely assembled, this contributes to small clearance tolerances between the airbag module and adjacent steering wheel elements.

In one embodiment of the steering wheel assembly, the steering wheel skeleton and the attachment component include fastening holes, the connection element comprising a connecting bolt that extends along a bolt axis through said fastening holes.

Preferably, with respect to the bolt axis at least one of the damping elements is axially biased. The axial bias with little effort helps influence the resonance field of the vibration absorber structure and ideally adjust the same to a desired frequency range.

The first damping element may be in the form of a damping sleeve and, with respect to the bolt axis, may be radially arranged between the connecting bolt and an edge of the fastening hole of the attachment component. Analogously, the second damping element may be in the form of a damping sleeve and, with respect to the bolt axis, may be radially arranged between the connecting bolt and an edge of the fastening hole of the steering wheel skeleton. This helps materialize the vibration-damped support of the attachment component on the steering wheel skeleton with especially little space required, which in turn has a positive effect on an as compact design of the steering wheel assembly as possible.

The connection element preferably comprises a screw bolt having a screw head and a screw shank as well as a screw nut adapted to be at least partially screwed onto the screw shank.

Accordingly, the screw bolt can extend in the axial direction from the screw head via a first shank portion and an adjacent second shank portion to a free end, the shank portions having different shank diameters, the screw nut being screwed onto the second shank portion and the damping elements in the area of the first shank portion being axially arranged, especially clamped, between the screw head and the screw nut.

According to a configuration variant of the steering wheel assembly having an especially simple and cost-efficient design, the first damping element and the second damping element are formed integrally and consequently form one single damping element.

Alternatively, two separate damping elements are provided which may either be directly adjacent to each other or may be axially spaced apart from each other. In this way, the oscillatory or vibration-damped couplings between the attachment component and the connection element as well as between the steering wheel skeleton and the connection element can be influenced individually and independently of each other, for example via the geometry and/or the material of the individual damping elements.

Especially preferred, in an unloaded home position of the steering wheel assembly both the attachment component and the steering wheel skeleton are spaced apart from the connection element and bear against the connection element exclusively via the first resilient damping element and/or the second resilient damping element. When the connection element is concretely designed as a connecting bolt, each of the attachment component and the steering wheel skeleton bears against the connection element with respect to the bolt axis both in the axial direction and in the radial direction exclusively via the first and/or the second resilient damping element. With any external excitations of the double-mass oscillating system, proper damping by which also resonance fields can be realized in an especially deep frequency spectrum is thus resulting.

Further, the invention also comprises a steering wheel assembly having a steering wheel skeleton, an attachment component, at least one resilient damping element that couples the attachment component to the steering wheel skeleton so as to be able to oscillate, and a connection element for fastening the attachment component to the steering wheel skeleton, the connection element being coupled so as to be able to oscillate both to the attachment component and to the steering wheel skeleton via the at least one damping element.

BRIEF DESCRIPTION OF THE DRAWINGS

Further features and advantages of the invention will be evident from the following description of preferred embodiments with reference to the drawings, wherein.

DESCRIPTION

Figure 1:
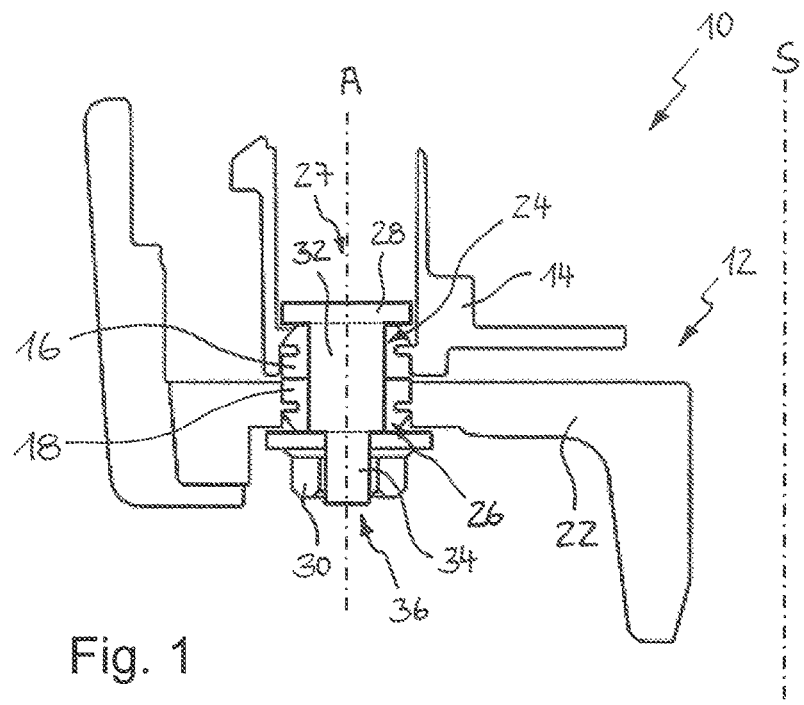
FIG. 1 shows a section detail of the steering wheel assembly according to the invention as set forth in one embodiment.
Figure 2:
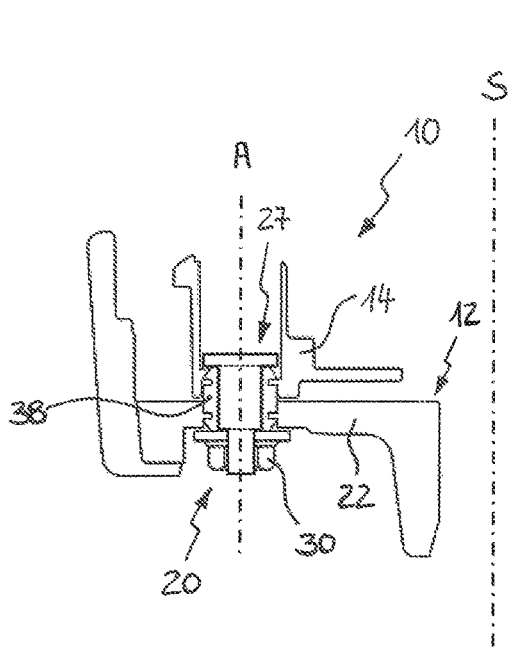
FIG. 2 shows a section detail of the steering wheel assembly according to the invention as set forth in another embodiment.
Figure 3:
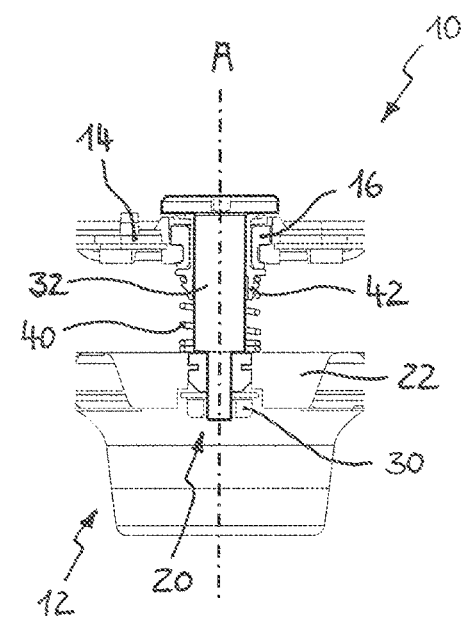
FIG. 3 shows a section detail of the steering wheel assembly according to the invention as set forth in yet another embodiment.

The FIGS. 1 to 3 illustrate different embodiments of a steering wheel assembly 10 of a vehicle steering wheel, comprising a steering wheel skeleton 12, an attachment component 14, at least one resilient damping element 16, 18 which couples the attachment component 14 to the steering wheel skeleton 12 so as to be able to oscillate, and a connection element 20 for fastening the attachment component 14 to the steering wheel skeleton 12. The connection element 20 is supported to be vibration-damped via the at least one resilient damping element 16, 18 both on the attachment component 14 and on the steering wheel skeleton 12.

In each case only a cutout of the steering wheel assembly 10 is illustrated with a bearing point between the attachment component 14 and the steering wheel skeleton 12, wherein, however, in total plural, especially three, said bearing points are provided between the attachment component 14 and the steering wheel skeleton 12.

In the present example configurations, the steering wheel skeleton 12 is a rigid metal part and forms the supporting core of a vehicle steering wheel rotatable about a steering axis S. The steering wheel skeleton 12 may be designed integrally or in several parts and especially includes a hub portion 22, a spoke portion and a rim portion.

The attachment component 14 equally is a substantially rigid member made from metal or plastic, for example. Preferably, the attachment component 14 is a mounting plate for a prefabricated airbag module which, after assembling the steering wheel assembly 10, is fastened to the mounting plate and especially simply snap-fastened to the mounting plate.

The connection element 20 comprises, according to FIGS. 1 to 3, a rigid connecting bolt having a bolt axis A, the connecting bolt being made from a metal and here being concretely designed as a screw bolt 27. In each of the attachment component 14 and the hub portion 22 of the steering wheel skeleton 12 a fastening hole 24, 26 is provided, the connecting bolt extending along its bolt axis A through said fastening holes 24, 26.

According to FIG. 1, there is provided a separate first damping element 16 which couples the connection element 20 to the attachment component 14 so as to be able to oscillate, as well as a separate second damping element 18 which couples the connection element 20 to the steering wheel skeleton 12 so as to be able to oscillate.

Each of the damping elements 16, 18 is made from a resilient material, especially an elastomer, the first damping element 16 being in the form of a damping sleeve and being radially arranged, with respect to the bolt axis A, between the connecting bolt and an edge of the fastening hole 24 of the attachment component 14. The second damping element 18 is equally in the form of a damping sleeve and is radially arranged, with respect to the bolt axis A, between the connecting bolt and an edge of the fastening hole 26 of the steering wheel skeleton 12.

The first damping element 16 is fixed substantially axially free from play on the attachment component 14 via a positive connection. To this end, at the edge of the fastening hole 24 a radially inwardly protruding projection is provided which engages in a radially outer groove portion of the sleeve-shaped damping element 16.

Correspondingly, the second damping element 18 is fixed substantially free from play on the steering wheel skeleton 12 via a positive connection. To this end, at the edge of the fastening hole 26 a radially inwardly protruding projection is provided which engages in a radially outer groove portion of the sleeve-shaped damping element 18.

According to FIG. 1, the two damping elements 16, 18 are configured identically and are arranged to be just mirror-inverted.

However, the two damping elements 16, 18 may be different in alternative configuration variants of the steering wheel assembly 10 especially regarding the material and/or the geometry so that the damping characteristic between the attachment component 14 and the connection element 20 can be adjusted independently of the damping characteristic between the steering wheel skeleton 12 and the connection element 20.

According to FIG. 1, the connection element 20 comprises a screw bolt 27 having a screw head 28 and a screw shank as well as a screw nut 30 that can be screwed at least partially onto the screw shank. The screw bolt 27 extends in the axial direction concretely from the screw head 28 via a first shank portion 32 and an adjacent second shank portion 34 to a free end 36, with the shank portions 32, 34 having different shank diameters. In the present case, the shank diameter of the second shank portion 34 is smaller than the shank diameter of the first shank portion 32 so that a radial step forming a defined stop for the screw nut 30 is present between the shank portions 32, 34.

The screw nut 30 is screwed onto the second shank portion 34 up to the radial step, while the sleeve-shaped damping elements 16, 18 are axially arranged between the screw head 28 and the screw nut 30 in the area of the first shank portion 32. The axial dimension of the first shank portion 32 and of the damping elements 16, 18 is preferably selected so that the damping elements 16, 18 are clamped between the screw head 28 and the screw nut 30 and thus have a defined axial bias. Said bias helps influence and ideally adjust the resonance field of the vibration absorber structure with little effort to a desired frequency range.

FIG. 2 illustrates another embodiment of the steering wheel assembly 10 which differs from the embodiment shown in FIG. 1 merely by the first damping element 16 and the second damping element 18 being formed integrally and constituting one single damping element 38. In this case, too, the connection element 20 is supported to be vibration-damped, however, both on the attachment component 14 and on the steering wheel skeleton 12 via the exactly one resilient damping element 38.

Thus, the number of the individual components is reduced and the constructional design of the steering wheel assembly 10 is facilitated. However, it is no longer possible to use different damping materials for the oscillatory coupling of the connection element 20 to the attachment component 14 and for the oscillatory coupling of the connection element 20 to the steering wheel skeleton 12 so that the adjustability of the damping characteristic is limited.

FIG. 3 illustrates yet another embodiment of the steering wheel assembly 10 which is different from the embodiment illustrated in FIG. 1 primarily by the two separate damping elements 16, 18 not being axially adjacent to each other but being axially spaced apart from each other.

In this design of the steering wheel assembly 10, larger vibration amplitudes are possible between the attachment component 14 and the steering wheel skeleton 12 due to the longer lever.

According to FIG. 3, axially between the two damping elements 16, 18 there is provided a pressure spring 40 that encloses the first shank portion 32 of the screw bolt 27 in the circumferential direction and, on the one hand, bears against the steering wheel skeleton 12 and, on the other hand, against the screw head 28 via a sliding sleeve 42.

The attachment component 14 is supported to be vibration-damped via the first damping element 16 on the sliding sleeve 42 and is supported to be also correspondingly vibration-damped via the sliding sleeve 42 on the first shank portion 32 of the screw bolt 27, the sliding sleeve 42 being capable of performing an axial movement relative to the first shank portion 32.

Accordingly, in this case a relative movement for actuating the vehicle horn takes place between the attachment component 14 and the steering wheel skeleton 12. The attachment component 14 is displaced together with the first damping element 16 and the sliding sleeve 42 by axial pressure applied to the attachment component 14 contrary to the force of the pressure spring 40 along the first shank portion 32, until a desired horn signal will sound, and is subsequently restored to the home position according to FIG. 3 by the pressure spring 40.

The second damping element 18 in this case is axially arranged in the area of the second shank portion 34 between the step of the screw shank and the screw nut 30, wherein a desired axial bias can be applied to the second damping element 18 via the screw nut 30.

The invention claimed is:

1. A steering wheel assembly comprising
a steering wheel skeleton (12),
an attachment component (14),
a connection element (20) for fastening the attachment component (14) to the steering wheel skeleton (12), and
a first resilient damping element (16) that couples the connection element (20) to the attachment component (14) in such a manner that the connection element (20) is able to oscillate relative to the attachment component (14),
wherein a second resilient damping element (18) is provided which couples the connection element (20) to the steering wheel skeleton (12) in such a manner that the connection element (20) is able to oscillate relative to the steering wheel skeleton (12).

2. The steering wheel assembly according to claim 1, wherein the attachment component (14) is a mounting plate configured to have an airbag module fastened thereto.

3. The steering wheel assembly according to claim 1, wherein the first damping element (16) is fixed substantially free from play, especially positively connected, to the attachment component (14).

4. The steering wheel assembly according to claim 1, wherein the second damping element (18) is fixed substantially free from play, especially positively connected, to the steering wheel skeleton (12).

5. The steering wheel assembly according to claim 1, wherein the steering wheel skeleton (12) and the attachment component (14) include fastening holes (24, 26), wherein the connection element (20) comprises a connecting bolt that extends along a bolt axis (A) through said fastening holes (24, 26).

6. The steering wheel assembly according to claim 5, wherein at least one of the damping elements (16, 18) is axially biased.

7. The steering wheel assembly according to claim 5, wherein the first damping element (16) is in the form of a damping sleeve and, with respect to the bolt axis (A) is radially arranged between the connecting bolt and an edge of the fastening hole (24) of the attachment component (14), and/or in that the second damping element (18) is in the form of a damping sleeve and, with respect to the bolt axis (A), is radially arranged between the connecting bolt and an edge of the fastening hole (26) of the steering wheel skeleton (12).

8. The steering wheel assembly according to claim 1, wherein the connection element (20) comprises a screw bolt (27) having a screw head (28) and a screw shank as well as a screw nut (30) that can be screwed at least partially onto the screw shank.

9. The steering wheel assembly according to claim 8, wherein the screw bolt (27) extends in the axial direction from the screw head (28) via a first shank portion (32) and an adjacent second shank portion (34) to a free end (36), wherein the shank portions (32, 34) have different shank diameters, the screw nut (30) is screwed onto the second shank portion (34) and the damping elements (16, 18) are axially arranged between the screw head (28) and the screw nut (30) in the area of the first shank portion (32).

10. The steering wheel assembly according to claim 1, wherein the first damping element (16) and the second damping element (18) are integrally formed and constitute one single damping element (38).

11. The steering wheel assembly according to claim 1, wherein, in an unloaded home position of the steering wheel assembly (10), both the attachment component (14) and the steering wheel skeleton (12) are spaced apart from the connection element (20) and bear against the connection element (20) exclusively via the first resilient damping element (16) and/or the second resilient damping element (18).

12. A steering wheel assembly, comprising
a steering wheel skeleton (12),
an attachment component (14),
at least one resilient damping element (16, 18, 38) that couples the attachment component (14) to the steering wheel skeleton (12) in such a manner that the attachment component (14) and the steering wheel skeleton (12) are able to oscillate relative to one another, and
a connection element (20) for fastening the attachment component (14) to the steering wheel skeleton (12),
wherein the connection element (20) is coupled via the at least one damping element (16, 18) both to the attachment component (14) and to the steering wheel skeleton (12) in such a manner that an entirety of the connection element (20) is able to oscillate relative to both the attachment component (14) and the steering wheel skeleton (12).

13. The steering wheel assembly according to claim 12, wherein the attachment component (14) is a mounting plate configured to have an airbag module fastened thereto.

14. The steering wheel assembly according to claim 12, wherein the first resilient damping element (16) is radially between the connection element (20) and the attachment component (14), the second resilient damping element (18) being radially between the connection element (20) and the steering wheel skeleton (12).

15. The steering wheel assembly according to claim 12, wherein the connection element (20) is a connecting bolt.

16. The steering wheel assembly according to claim 15, wherein the steering wheel skeleton (12) and the attachment component (14) include fastening holes (24, 26), the connecting bolt (20) extending along a bolt axis (A) through the fastening holes (24, 26).

17. The steering wheel assembly according to claim 16, wherein the at least one resilient damping element (16, 18, 38) has a first portion in the fastening hole (24) of the attachment component (14) and a second portion in the fastening hole (26) of the steering wheel skeleton (12).

18. The steering wheel assembly according to claim 1, wherein the connection element (20) is a connecting bolt.

19. The steering wheel assembly according to claim 18, wherein the first resilient damping element (16) is radially between the connecting bolt (20) and the attachment component (14), the second resilient damping element (18) being radially between the connecting bolt (20) and the steering wheel skeleton (12).

20. The steering wheel assembly according to claim 1, wherein the entirety of the connection element (20) is able to oscillate relative to both the attachment component (14) and the steering wheel skeleton (12).

* * * * *